US 11,804,595 B2

United States Patent
Ota et al.

(10) Patent No.: US 11,804,595 B2
(45) Date of Patent: Oct. 31, 2023

(54) PRE-LITHIATION OF ELECTRODE MATERIALS IN A SEMI-SOLID ELECTRODE

(71) Applicants: 24M Technologies, Inc., Cambridge, MA (US); Kyocera Corporation, Kyoto (JP)

(72) Inventors: Naoki Ota, Lexington, MA (US); Mihai Duduta, Somerville, MA (US); Takaaki Fukushima, Okayama (JP); Hiuling Zoe Yu, Quincy, MA (US); Taison Tan, Pasadena, CA (US); Hiromitsu Mishima, Kirishima (JP)

(73) Assignees: 24M Technologies, Inc., Cambridge, MA (US); Kyocera Corporation, Kyoto (JP)

( * ) Notice: Subject to any disclaimer, the term of this patent is extended or adjusted under 35 U.S.C. 154(b) by 0 days.

(21) Appl. No.: 16/654,784

(22) Filed: Oct. 16, 2019

(65) Prior Publication Data

US 2020/0106094 A1 Apr. 2, 2020

Related U.S. Application Data

(63) Continuation of application No. 14/930,991, filed on Nov. 3, 2015, now Pat. No. 10,497,935.
(Continued)

(51) Int. Cl.
*H01M 4/38* (2006.01)
*H01M 4/587* (2010.01)
(Continued)

(52) U.S. Cl.
CPC .......... *H01M 4/382* (2013.01); *H01M 4/049* (2013.01); *H01M 4/133* (2013.01);
(Continued)

(58) Field of Classification Search
CPC .................................................... H01M 4/382
See application file for complete search history.

(56) References Cited

U.S. PATENT DOCUMENTS

| 8,722,226 B2 | 5/2014 | Chiang et al. |
| 8,722,227 B2 | 5/2014 | Chiang et al. |

(Continued)

FOREIGN PATENT DOCUMENTS

| JP | 2011-054324 | 3/2011 |
| JP | 2011-065841 A | 3/2011 |

(Continued)

OTHER PUBLICATIONS

Seong, I. W. et al., "Electrochemical behavior of a lithium-pre-doped carbon-coated silicon monoxide anode cell," Journal of Power Sources, 189(1):511-514 (2009) (Year: 2009).*

(Continued)

*Primary Examiner* — Daniel S Gatewood
(74) *Attorney, Agent, or Firm* — Cooley LLP

(57) ABSTRACT

Embodiments described herein relate generally to electrochemical cells having pre-lithiated semi-solid electrodes, and particularly to semi-solid electrodes that are pre-lithiated during the mixing of the semi-solid electrode slurry such that a solid-electrolyte interface (SEI) layer is formed in the semi-solid electrode before the electrochemical cell formation. In some embodiments, a semi-solid electrode includes about 20% to about 90% by volume of an active material, about 0% to about 25% by volume of a conductive material, about 10% to about 70% by volume of a liquid electrolyte, and lithium (as lithium metal, a lithium-containing material, and/or a lithium metal equivalent) in an amount sufficient to substantially pre-lithiate the active material. The lithium metal is configured to form a solid-electrolyte interface (SEI) layer on a surface of the active material before an
(Continued)

initial charging cycle of an electrochemical cell that includes the semi-solid electrode.

13 Claims, 6 Drawing Sheets

Related U.S. Application Data

(60) Provisional application No. 62/074,372, filed on Nov. 3, 2014.

(51) Int. Cl.
  *H01M 10/0525* (2010.01)
  *H01M 10/04* (2006.01)
  *H01M 4/36* (2006.01)
  *H01M 10/058* (2010.01)
  *H01M 4/04* (2006.01)
  *H01M 4/1393* (2010.01)
  *H01M 4/62* (2006.01)
  *H01M 4/133* (2010.01)
  *H01M 4/02* (2006.01)
  *H01M 4/134* (2010.01)
  *H01M 4/485* (2010.01)
  *H01M 4/1395* (2010.01)

(52) U.S. Cl.
  CPC ......... *H01M 4/1393* (2013.01); *H01M 4/364* (2013.01); *H01M 4/587* (2013.01); *H01M 4/625* (2013.01); *H01M 10/049* (2013.01); *H01M 10/058* (2013.01); *H01M 10/0525* (2013.01); *H01M 4/0495* (2013.01); *H01M 4/134* (2013.01); *H01M 4/1395* (2013.01); *H01M 4/386* (2013.01); *H01M 4/387* (2013.01); *H01M 4/485* (2013.01); *H01M 2004/027* (2013.01)

(56) References Cited

U.S. PATENT DOCUMENTS

| | | |
|---|---|---|
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 * | 11/2016 | Doherty ................. H01G 11/38 |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 2005/0130043 A1 | 6/2005 | Gao et al. |
| 2010/0047671 A1 | 2/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0164499 A1 | 6/2012 | Chiang et al. |
| 2013/0045427 A1 | 2/2013 | Zhamu et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0272584 A1 * | 9/2014 | Jiang .................... H01M 4/136 |
| | | 429/231.95 |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0161688 A1 | 5/2020 | Chaing et al. |

(56) References Cited

U.S. PATENT DOCUMENTS

| | | | |
|---|---|---|---|
| 2020/0220118 A1 | 7/2020 | Bazzarella et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0091366 A1 | 3/2021 | Bazzarella et al. |

FOREIGN PATENT DOCUMENTS

| | | |
|---|---|---|
| JP | 2012-009209 A | 1/2012 |
| JP | 2012-074189 A | 4/2012 |
| JP | 2012-204306 | 10/2012 |
| JP | 2012-204310 | 10/2012 |
| JP | 2013-152817 A | 8/2013 |
| JP | 2013-191296 A | 9/2013 |
| JP | 2017-534164 A | 11/2017 |
| KR | 10-2011-0002211 A | 1/2011 |
| WO | WO 2005/013397 | 2/2005 |
| WO | WO 2010/071166 A1 | 5/2012 |
| WO | WO 2014/150210 | 9/2014 |
| WO | WO2014176267 * | 10/2014 |
| WO | WO 2013/011568 A1 | 2/2015 |
| WO | WO 2015/176051 | 11/2015 |
| WO | WO 2016/073438 | 5/2016 |
| WO | WO 2014/092016 A1 | 1/2017 |

OTHER PUBLICATIONS

Office Action for European Application No. 15791232.0, dated Aug. 3, 2018, 9 pages.

Office Action for European Application No. 15791232.0, dated Jan. 28, 2019, 6 pages.

Office Action for European Application No. 15791232.0, dated Nov. 15, 2019, 6 pages.

Notice of Reasons for Rejection for Japanese Application No. 2017-542825, dated Aug. 23, 2019, 18 pages.

Office Action for U.S. Appl. No. 14/930,991, dated Aug. 10, 2018, 9 pages.

Office Action for U.S. Appl. No. 14/930,991, dated Mar. 8, 2019, 11 pages.

International Search Report and Written Opinion for International Application No. PCT/US2015/058770, dated Jan. 7, 2016, 19 pages.

Du, Z. et al., "High energy density calendered si alloy/graphite anodes," Journal of The Electrochemical Society, vol. 161, No. 10, pp. A1698-1705, Jul. 2014.

Liu, N. et al., "Prelithiated Silicon Nanowires as an Anode for Lithium Ion Batteries," ACS Nano, 5(8):6487-6493 (2011).

Seong, I. W. et al., "Electrochemical behavior of a lithium-predoped carbon-coated silicon monoxide anode cell," Journal of Power Sources, 189(1):511-514 (2009).

Seong, I. W. et al., "Electrochemical behavior of a silicon monoxide and Li-powder double layer anode cell," Journal of Power Sources, 195(18):6143-6147 (2010).

Yang, X. et al., "Nanosized silicon-based composite derived by in situ mechanochemical reduction for lithium ion batteries," Journal of Power Sources, 164(2):880-884 (2007).

Notice of Reasons for Rejection for Japanese Application No. 2017-542825, dated Apr. 23, 2020, 11 pages.

Office Action for European Application No. 15791232.0, dated Jul. 9, 2020, 5 pages.

Office Action for European Application No. 15791232.0, dated Feb. 9, 2021, 6 pages.

Decision of Rejection for Japanese Application No. 2017-542825, dated Dec. 22, 2020, 12 pages.

Who: "APPENDIX: Chemical and Physical Data for Some Non-Heterocyclic Polycyclic Aromatic Hydrocarbons," In: IARC Working Group on the Evaluation of Carcinogenic Risks to Humans. Some Non-heterocyclic Polycyclic Aromatic Hydrocarbons and Some Related Exposures. Lyon (FR): International Agency for Research on Cancer; 2010. (IARC Monographs on the Evaluation of Carcinogenic Risks to Humans, No. 92.), Retrieved from the Internet: <https://www.ncbi.nlm.nih.gov/books/NBK321706/>, Dec. 2010, 30 pages.

IFA: "Carbon Black", Jan. 2021, Retrieved from the Internet: <URL:https://gestis-database.dguv.de/data?name=091940, Retrieved on Jan. 28, 2021, 1 page.

Haynes, W. M. (ed.), "Propylene Carbonate," In: CRC Handbook of Chemistry and Physics. 95th Edition. CRC Press LLC, Boca Raton, FL, Jan. 18, 2021, Retrieved from the Internet: <URL:https://pubchem.ncbi.nlm.nih.gov/compound/Propylene-carbonate>, Retrieved on Jan. 28, 2021, 1 page.

Thinky: "Container/ Adapter List for Thinky Mixer", Apr. 30, 2016, Retrieved from the Internet: <URL:https://www.intertronics.co.uk/wp-content/uploads/2016/11/ThinkyContainer-and-Adapter-List-2016.pdf>, Retrieved on Jan. 28, 2021, 5 pages.

Office Action for Japanese Application No. 2021-071662, dated Feb. 24, 2022, 18 pages.

Extended European Search Report for European Application No. 21218462.6, dated Jun. 28, 2022, 11 pages.

Vaughey, J.T. et al., "Pre-lithiation reactions of lithium-ion battery electrodes," ECS Meeting Abstracts—208th ECS Meeting, Oct. 21, 2005, pp. 1-1, XP055933130.

* cited by examiner

PRE-LITHIATION OF ELECTRODE MATERIALS IN A SEMI-SOLID ELECTRODE

CROSS-REFERENCE TO RELATED APPLICATIONS

This application is a continuation of U.S. patent application Ser. No. 14/930,991, filed Nov. 3, 2015 (now U.S. Pat. No. 10,497,935) and titled "Pre-Lithiation of Electrode Materials in a Semi-Solid Electrode," which claims priority to and the benefit of U.S. Provisional Patent Application Ser. No. 62/074,372, filed Nov. 3, 2014 and titled "Pre-Lithiation of Electrode Materials in a Semi-Solid Electrode," the disclosures of which i-s are hereby incorporated by reference in their entirety.

BACKGROUND

As the demand for batteries having better electronic performance, for example, higher charge capacity, energy density, conductivity, and rate capabilities increases, new electrode designs are needed to meet these criteria Lithium-ion electrodes and particularly anodes suffer from irreversible capacity loss at the battery formation stage (i.e., the initial cycling step which includes charging and discharging of the electrochemical cell). The irreversible capacity loss can happen due to the transfer of lithium ions from the cathode active material to the anode, where they are used in the formation of the solid-electrolyte interface (SEI) layer.

SUMMARY

Embodiments described herein relate generally to electrochemical cells having pre-lithiated semi-solid electrodes (e.g., anodes), and particularly to semi-solid electrodes that are pre-lithiated during the mixing of the semi-solid electrode slurry such that a solid-electrolyte interface (SEI) layer is formed in the semi-solid electrode prior to the electrochemical cell formation and/or initial cycling. In some embodiments, a semi-solid electrode includes about 20% to about 90%/o by volume of an active material, about 0% to about 25% by volume of a conductive material, about 10% to about 70% by volume of a liquid electrolyte, and lithium (as lithium metal, a lithium-containing material, and/or a lithium metal equivalent) in an amount sufficient to substantially pre-lithiate the active material. The lithium metal is configured to form a solid-electrolyte interface (SEI) layer on a surface of the active material and in some cases lithiate and charge the anode material before an initial charging cycle of an electrochemical cell that includes the semi-solid electrode.

DETAILED DESCRIPTION

Figure 1:
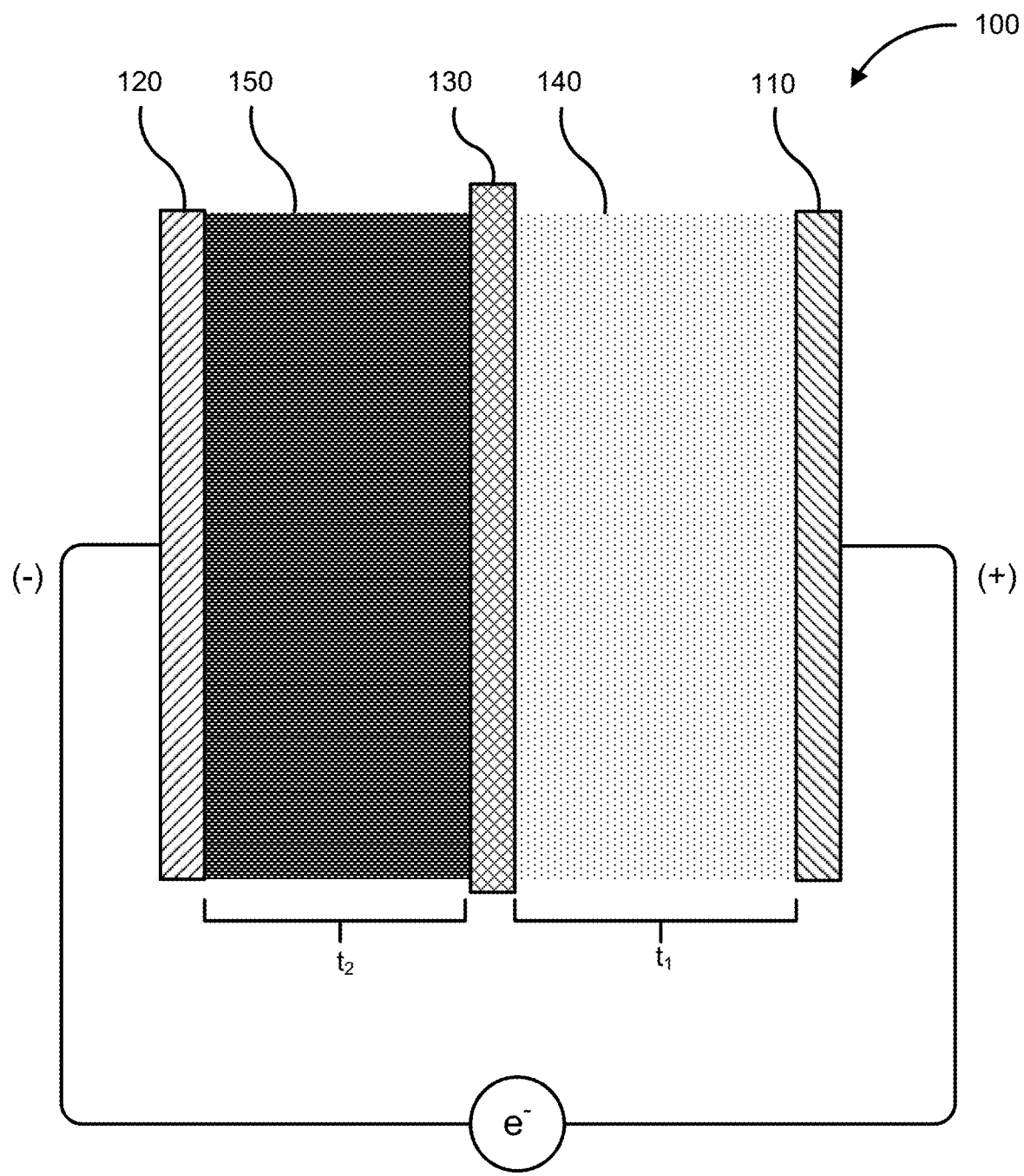
FIG. 1 is a schematic illustration of an electrochemical cell according to an embodiment.

Embodiments described herein relate generally to electrochemical cells having pre-lithiated semi-solid electrodes, and particularly to semi-solid electrodes that are pre-lithiated during the mixing of the semi-solid electrode slurry such that a solid-electrolyte interface (SEI) layer is formed in the semi-solid electrode before the electrochemical cell formation. Consumer electronic batteries have gradually increased in energy density with the progress of lithium-ion battery technology. The stored energy, or charge capacity, of a manufactured battery is a function of: (1) the inherent charge capacity of the active material (mAh/g), (2) the volume of the electrodes ($cm^3$) (i.e., the product of the electrode thickness, electrode area, and number of layers (stacks)), and (3) the loading of active material in the electrode media (e.g., grams of active material per $cm^3$ of electrode media). Therefore, to enhance commercial appeal (e.g., increased energy density and decreased cost), it is generally desirable to increase the areal charge capacity ($mAh/cm^2$) and also to reduce the irreversible capacity loss that can occur, particularly in lithium-ion batteries.

Semi-solid electrodes described herein can be made: (i) thicker (e.g., greater than about 250 µm-up to about 2,000 µm or even greater) due to the reduced tortuosity and higher electronic conductivity of the semi-solid electrode, (ii) with higher loadings of active materials, and (iii) with a simplified manufacturing process utilizing less equipment. These semi-solid electrodes can be formed in fixed or flowable configurations and decrease the volume, mass and cost contributions of inactive components with respect to active components, thereby enhancing the commercial appeal of batteries made with the semi-solid electrodes. The reduced tortuosity and a higher electronic conductivity of the semi-solid electrodes described herein, results in superior rate capability and charge capacity of electrochemical cells formed from the semi-solid electrodes.

Since the semi-solid electrodes described herein can be made substantially thicker than conventional electrodes, the ratio of active materials (i.e., the semi-solid cathode and/or anode) to inactive materials (i.e. the current collector and separator) can be much higher in a battery formed from electrochemical cell stacks that include semi-solid electrodes relative to a similar battery formed from electrochemical cell stacks that include conventional electrodes. This substantially increases the overall charge capacity and energy density of a battery that includes the semi-solid electrodes described herein. Examples of electrochemical cells utilizing thick semi-solid electrodes and various formulations thereof are described in U.S. patent application Ser. No. 13/872,613 (also referred to as "the '613 application"), filed Apr. 29, 2013, entitled "Semi-Solid Electrodes Having High Rate Capability," and U.S. patent application Ser. No. 14/202,606 (also referred to as "the '606 application"), filed Mar. 10, 2014, entitled "Asymmetric Battery, Having a Semi-Solid Cathode and High Energy Density Anode," the entire disclosures of which are incorporated by reference herein.

Lithium-ion electrodes, and particularly their anodes, can suffer from irreversible capacity loss at the battery formation stage (i.e., the initial cycling step which includes charging and discharging of the electrochemical cell that includes the electrodes). Irreversible capacity loss can occur due to consumption of lithium ions from the cathode active material by the anode, which uses those lithium ions in the formation of the SEI layer. This quantity of consumed lithium becomes unavailable for subsequent use in electric charge storage, and therefore represents an undesirable and irreversible capacity loss. Moreover, this irreversible capacity loss can be accompanied by volumetric expansion of the anode due to the lithium ions being irreversibly trapped in the anode material. This volumetric expansion problem is exacerbated in semi-solid anodes that include high capacity anode materials (e.g., silicon or tin) in the semi-solid anode formulation, since high capacity anode materials are capable of incorporating a larger amount of lithium (and enable higher energy cell designs), as compared with conventional materials such as graphite. For example, while graphite can incorporate about 1 lithium atom for every 6 carbon atoms, silicon can theoretically incorporate about 4.4 lithium atoms for every silicon atom. This higher capacity can allow the formation of electrochemical cells with much higher charge capacity per unit area relative to conventional electrochemical cells, however the higher number of lithium ions incorporated also implies that the semi-solid anodes that include high capacity materials consume more of the lithium from the cathode to form the SEI layer, leading to an even higher magnitude of the irreversible capacity. Furthermore, silicon experiences substantial volumetric expansion due to the incorporation of the lithium ions into the silicon atoms. The repeated volume changes (i.e., expansion and/or contraction) can negatively impact the charge capacity, and cause irreversible mechanical damage which can reduce the life of the electrochemical cell. Further discussion of the effects of lithiation on stress and morphology of silicon electrodes can be found in "In situ Measurements of Stress Evolution in Silicon Thin Films During Electrochemical Lithiation and Delithiation," by V. Sethuraman, et al., Journal of Power Sources 195 (2010) 5062-5066, the contents of which are hereby incorporated by reference in their entirety.

Embodiments of the semi-solid electrodes described herein are pre-lithiated with lithium during the preparation of the semi-solid electrode suspension and before formation of an electrochemical cell, thereby overcoming, at least in part, the irreversible capacity loss and volumetric expansion problems discussed above. The semi-solid electrodes described herein allow the mixing of the lithium metal during the mixing process of the electrode slurry, unlike conventional electrodes. This is possible because the semi-solid electrodes described herein includes the electrolyte mixed into the semi-solid electrode composition. The electrolyte provides a medium for lithium ions provided by the lithium metal to interact with the active materials included in the semi-solid electrode, particularly the active materials (e.g., graphite) or high capacity materials (e.g., silicon or tin) included in a semi-solid anode. This allows the SEI layer to form during the mixing step such that when such a pre-lithiated semi-solid anode is paired with a cathode in an electrochemical cell, the lithium ions from the cathode are not used to form the SEI layer. Said another way, because of pre-lithiation, the lithium ions from the cathode do not contribute to irreversible capacity loss at the anode, allowing the cathode to maintain its initial capacity after electrochemical cell formation. Moreover, the electrolyte included in the semi-solid electrode composition also protects the lithium metal from the ambient environment (e.g., moisture or humidity of the ambient environment) and thereby, allows the lithium metal to remain stable during the mixing process.

Another advantage provided by pre-lithiation of the semi-solid electrodes described herein is that the anode can be pre-lithiated such that it is completely charged before it is paired with a cathode. This enables the use of cathodes that do not include any available lithium for forming the SEI layer in the anode. Thus, carbon based anode materials can be used instead of lithium metal leading to better cycle stability and safety. Furthermore, intercalation of the lithium ions into high capacity materials included in the anode can also occur during the mixing step, which allows any expansion of the high capacity material to occur during the mixing step. Said another way, the pre-lithiation can pre-expand the semi-solid anode such that the semi-solid anode experiences less expansion during electrochemical cell formation and subsequent charge/discharge cycles. In this manner, any physical damage to the electrochemical cell due to the semi-solid anode expansion is substantially reduced or in certain cases possibly eliminated. Thus, electrochemical cells that include such pre-lithiated semi-solid anodes can have substantially higher mechanical stability and longer life compared to anodes (e.g., semi-solid anodes) that are not pre-lithiated.

Embodiments of the pre-lithiated semi-solid electrodes described herein provide several advantages over conventional electrodes including, for example: (1) formation of SEI layer on an active material of the semi-solid electrode (e.g., the anode) before the electrochemical cell is formed; (2) limiting or otherwise substantially eliminating the formation of an SEI layer with lithium ions extracted from the other electrode (e.g., the cathode); (3) retaining of substantially all of an initial capacity of the other electrode (e.g., the cathode) after electrochemical cell formation; (4) pre-expansion of semi-solid anodes that include a high capacity material by pre-lithiation before electrochemical cell formation to limit and or reduce any volumetric expansion of the semi-solid anode on electrochemical cell formation and during regular use; and (5) enhancing the charge capacity and operational lifetime of the electrochemical cell.

In some embodiments, a semi-solid electrode includes about 20% to about 90% by volume of an active material, about 0% to about 25% by volume of a conductive material, about 10% to about 70% by volume of a liquid electrolyte, and lithium (as lithium metal, a lithium-containing material, and/or a lithium metal equivalent) in an amount sufficient to substantially pre-lithiate the active material. The lithium is configured to form a solid-electrolyte interface (SEI) layer on a surface of the active material before an initial charging cycle of an electrochemical cell that includes the semi-solid electrode. In some embodiments, the lithium metal can include at least one of lithium metal powder, lithium salt, lithium foil, and lithium metal disposed on a semi-solid electrode current collector.

In some embodiments, a semi-solid electrode, excluding the electrolyte component, includes about 75% to about 100% by weight of an active material, about 0% to 50% by weight of a conductive material, and about 1% to 50% lithium metal or lithium-ion equivalents. The total solid components of the electrode are composed of the active material, conductive material, and lithium-ion equivalents. The solid components compose of 35% to about 90% by volume of the semi-solid electrode and the electrolyte composes of 10% to about 65% by volume of the semi-solid electrode. The lithium metal is added to the electrode in order to consume the irreversible capacity of the anode material, which can range from 1% to 50% of the theoretical first charge capacity of the anode material. In other usages, the lithium metal may be mixed with a non-lithiated cathode material to create a cathode material that is lithiated for use in a secondary battery such as $FeS_2$. In this case, the amount of lithium metal or lithium-ion equivalents used would be equal to the total available capacity of the cathode. Another usage of pre-lithiation is to lithiate the anode to not only consume all the irreversible capacity but also further lithiate the anode in order to provide a buffer for active lithium-ions that would be saved as a reserve in future cycling usage. In such embodiments, the amount of lithium metal used would range from 10% to 50% of the theoretical capacity of the anode. In another example, the pre-lithiation process could be used to lithiate the cathode material to provide it with an excess amount of lithium ions (i.e., to "over-lithiate" the cathode), thus possibly making the material more stable during electrochemical cycling.

In some embodiments, a method of preparing a pre-lithiated anode includes combining an active material and a lithium metal to form a pre-lithiated anode. An electrolyte is combined with the pre-lithiated material to form a semi-solid anode material. The semi-solid anode material is then formed into a semi-solid anode. In some embodiments, a conductive material can optionally be combined with the pre-lithiated anode material. In some embodiments, a high capacity material can optionally be combined with the pre-lithiated anode material.

As used herein, the term "about" and "approximately" generally mean plus or minus 100/% of the value stated, e.g., about 250 μm would include 225 μm to 275 μm, about 1,000 μm would include 900 μm to 1,100 μm.

As used herein, the term "semi-solid" refers to a material that is a mixture of liquid and solid phases, for example, such as particle suspension, colloidal suspension, emulsion, gel, or micelle.

As used herein, the terms "conductive carbon network" and "networked carbon" relate to a general qualitative state of an electrode. For example, an electrode with a carbon network (or networked carbon) is such that the carbon particles within the electrode assume an individual particle morphology and arrangement with respect to each other that facilitates electrical contact and electrical conductivity between particles and through the thickness and length of the electrode. Conversely, the term "unnetworked carbon" relates to an electrode wherein the carbon particles either exist as individual particle islands or multi-particle agglomerate islands that may not be sufficiently connected to provide adequate electrical conduction through the electrode.

As used herein, the term "electrochemical cell formation" refers to the initial charge and/or discharge cycle performed on an electrochemical cell after the components of the electrochemical cell (e.g., cathode, anode, spacer, current collectors, etc.) are assembled for the first time to form the electrochemical cell.

As used herein, the term "capacity" may be synonymous with "battery capacity," "volumetric energy density," and/or "specific energy."

FIG. 1 shows a schematic illustration of an electrochemical cell 100. The electrochemical cell 100 includes a positive current collector 110, a negative current collector 120 and a separator 130 disposed between the positive current collector 110 and the negative current collector 120. The positive current collector 110 is spaced from the separator 130 by a first distance $t_1$ and at least partially defines a positive electroactive zone. The negative current collector 120 is spaced from the separator 130 by a second distance $t_2$ and at least partially defines a negative electroactive zone. A semi-solid cathode 140 is disposed in the positive electroactive zone and a semi-solid anode 150 is disposed in the negative electroactive zone. In some embodiments, the thickness of the positive electroactive zone defined by the distance $t_1$ and/or the thickness of the negative electroactive zone defined by the distance $t_2$ can be in range of about 250 μm to about 2,000 μm.

The semi-solid cathode 140 and/or the semi-solid anode 150 can be disposed on a current collector, for example, coated, casted, drop coated, pressed, roll pressed, or deposited using any other suitable method. The semi-solid cathode 140 can be disposed on the positive current collector 110 and the semi-solid anode 150 can be disposed on the negative current collector 120. For example the semi-solid cathode 140 and/or the semi-solid anode 150 can be coated, casted, calendered and/or pressed on the positive current collector 110 and the negative current collector 120, respectively. The positive current collector 110 and the negative current collector 120 can be any current collectors that are electronically conductive and are electrochemically inactive under the operating conditions of the cell. Typical current collectors for lithium cells include copper, aluminum, or titanium for the negative current collector 120 and aluminum for the positive current collector 110, in the form of sheets or mesh, or any combination thereof.

Current collector materials can be selected to be stable at the operating potentials of the semi-solid cathode 140 and the semi-solid anode 150 of the electrochemical cell 100. For example, in non-aqueous lithium systems, the positive current collector 110 can include aluminum, or aluminum coated with conductive material that does not electrochemically dissolve at operating potentials of 2.5-5.0 V with respect to $Li/Li^+$. Materials coating an aluminum current collector may include platinum, gold, nickel, conductive metal oxides such as vanadium oxide, and carbon. The negative current collector 120 can include copper or other metals that do not form alloys or intermetallic compounds with lithium, carbon, and/or coatings comprising such materials disposed on another conductor.

The semi-solid cathode 140 and the semi-solid anode 150 included in an electrochemical cell can be separated by a separator 130. For example, the separator 130 can be any conventional membrane that is capable of ion transport. In some embodiments, the separator 130 is a liquid impermeable membrane that permits the transport of ions therethrough, namely a solid or gel ionic conductor. In some embodiments the separator 130 is a porous polymer membrane infused with a liquid electrolyte that allows for the shuttling of ions between the semi-solid cathode 140 and the semi-solid anode 150 electroactive materials, while preventing the transfer of electrons. In some embodiments, the separator 130 is a microporous membrane that prevents particles forming the positive and negative electrode compositions from crossing the membrane. In some embodiments, the separator 130 is a single or multilayer microporous separator, optionally with the ability to fuse or "shut down" above a certain temperature so that it no longer transmits working ions, of the type used in the lithium ion battery industry and well-known to those skilled in the art. In some embodiments, the separator 130 can include a polyethyleneoxide (PEO) polymer in which a lithium salt is complexed to provide lithium conductivity, or Nafion™ membranes which are proton conductors. For example, PEO based electrolytes can be used as the separator 130, which is pinhole-free and a solid ionic conductor, optionally stabilized with other membranes such as glass fiber separators as supporting layers. PEO can also be used as a slurry stabilizer, dispersant, etc. in the positive or negative redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

The semi-solid cathode 140 can be a semi-solid stationary cathode. The semi-solid cathode 140 can include an ion-storing solid phase material which can include, for example, an active material and/or a conductive material. The quantity of the ion-storing solid phase material can be in the range of about 0% to about 90% by volume. The semi-solid cathode 140 can include an active material such as, for example, a lithium bearing compound (e.g., Lithium Iron Phosphate (LFP), $LiCoO_2$, $LiCoO_2$ doped with Mg, $LiNiO_2$, Li(Ni, Co, Al)$O_2$ (known as "NCA"), Li(Ni, Mn, Co)$O_2$ (known as "NMC"), $LiMn_2O_4$ and its derivatives, etc.). The semi-solid cathode 140 can also include a conductive material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets, aggregates of graphene sheets, and/or any other conductive material, alloys or combination thereof. The semi-solid cathode 140 can also include a non-aqueous liquid electrolyte such as, for example, ethylene carbonate, dimethyl carbonate, diethyl carbonate, propylene carbonate, gamma butyrolactone, or any other electrolyte described herein or combination thereof. In some embodiments, the electrolyte comprises one or more of the following salts: lithium hexafluorophosphate ($LiPF_6$), $LiPF_5(CF_3)$, $LiPF_5(C_2F_5)$, $LiPF_5(C_3F_7)$, $LiPF_4(CF_3)_2$, $LiPF_4(CF_3)(C_2F_5)$, $LiPF_3(CF_3)_3$, $LiPF_3(CF_2CF_3)_3$, $LiPF_4(C_2O_4)_2$, $LiBF_4$, $LiBF_3(C_2F_5)$, LiBOB, lithium bis(oxalato)borate (LiBOP), lithium oxalyldifluoroborate (LIODFB), lithium difluoro(oxalato)borate (LiDFOB), lithium bis(trifluoro methanesulfonyl) imide (LiTFSI), $LiN(SO_2CF_3)_2$, lithium bis(fluorosulfonyl) imide (LiFSI), $LiN(SO_2F)_2$, $LiN(SO_2C_2F_5)_2$, $LiCF_3SO_3$, $LiAsF_6$, $LiSbF_6$, $LiClO_4$, LiTFSI, LiFSI, and/or other organic or inorganic anions and/or compounds, for example belonging to the families listed herein.

In some embodiments, the semi-solid anode 150 includes an ion-storing solid phase material which can include, for example, an active material and/or a conductive material. The quantity of the ion-storing solid phase material can be in the range of about 0% to about 90% by volume. The anode 150 can include an anode active material such as, for example, lithium metal, carbon, lithium-intercalated carbon, graphite, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof.

The semi-solid anode 150 (e.g., a semi-solid anode) can also include a conductive material which can be a carbonaceous material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In some embodiments, the semi-solid anode 150 can also include a non-aqueous liquid electrolyte such as, for example, ethylene carbonate, dimethyl carbonate, diethyl carbonate, propylene carbonate, or any other electrolyte described herein or combination thereof.

In some embodiments, the semi-solid cathode 140 and/or the semi-solid anode 150 can include active materials and optionally conductive materials in particulate form suspended in a non-aqueous liquid electrolyte. In some embodiments, the semi-solid cathode 140 and/or the semi-solid anode 150 particles (e.g., cathodic or anodic particles, which in some embodiments are secondary particles formed by the agglomeration of primary particles) can have an effective diameter of at least about 1 μm. In some embodiments, the cathodic or anodic particles have an effective diameter between about 1 μm and about 10 μm. In other embodiments, the cathodic or anodic particles have an effective diameter of at least about 10 μm or more. In some embodiments, the cathodic or anodic particles have an effective diameter of less than about 1 μm. In other embodiments, the cathodic or anodic particles have an effective diameter of less than about 0.5 μm. In other embodiments, the cathodic or anodic particles have an effective diameter of less than about 0.25 μm. In other embodiments, the cathodic or anodic particles have an effective diameter of less than about 0.1 μm. In other embodiments, the cathodic or anodic particles have an effective diameter of less than about 0.05 μm. In other embodiments, the cathodic or anodic particles have an effective diameter of less than about 0.01 μm.

In some embodiments, the semi-solid cathode 140 includes about 20% to about 90% by volume of an active material. In some embodiments, the semi-solid cathode 140 can include about 40% to about 75% by volume, about 50% to about 75% by volume, about 60% to about 75% by volume, or about 60% to about 90% by volume of an active material.

In some embodiments, the semi-solid cathode 140 can include about 0% to about 25% by volume of a conductive material. In some embodiments, the semi-solid cathode 140 can include about 0.5% to about 25% by volume, about 1% to about 6% by volume, about 6% to about 12%, or about 2% to about 15% by volume of a conductive material.

In some embodiments, the semi-solid cathode 140 can include about 10% to about 70% by volume of an electrolyte. In some embodiments, the semi-solid cathode 140 can include about 30% to about 60%, about 40% to about 50%, or about 10% to about 40% by volume of an electrolyte.

In some embodiments, the semi-solid anode 150 can include about 20% to about 90% by volume of an active material. In some embodiments, the semi-solid anode 150 can include about 40% to about 75% by volume, about 50% to about 75%, about 60% to about 75%, or about 60% to about 90% by volume of an active material.

In some embodiments, the semi-solid anode 150 can include about 0% to about 20% by volume of a conductive material. In some embodiments, the semi-solid anode 150 can include about 1% to about 10%, 1% to about 6%, about 0.5% to about 2% by volume, about 2% to about 6%, or about 2% to about 4% by volume of a conductive material.

In some embodiments, the semi-solid anode 150 can include about 10%/o to about 70% by volume of an electrolyte. In some embodiments, the semi-solid anode 150 can include about 30% to about 60%, about 40% to about 50%, or about 10% to about 40% by volume of an electrolyte.

Examples of active materials, conductive materials, and/or electrolytes that can be used in the semi-solid cathode 140 and/or the semi-solid anode 150 compositions, various formulations thereof, and electrochemical cells formed therefrom, are described in the '613 application and the '606 application.

In some embodiments, the semi-solid anode 150 can also include about 1% to about 30% by volume of a high capacity material. Such high capacity materials can include, for example, silicon, bismuth, boron, gallium, indium, zinc, tin, antimony, aluminum, titanium oxide, molybdenum, germanium, manganese, niobium, vanadium, tantalum, iron, copper, gold, platinum, chromium, nickel, cobalt, zirconium, yttrium, molybdenum oxide, germanium oxide, silicon oxide, silicon carbide, any other high capacity materials or alloys thereof, and any combination thereof. In some embodiments, the semi-solid anode can include about 1% to about 5% by volume, about 1% to about 10% by volume, or about 1% to about 20% by volume of the high capacity material. In some embodiments, the high capacity material can constitute up to 50% of the volume of the semi-solid anode. In other embodiments, the high capacity material can constitute up to 100%, or substantially all, of the volume of the semi-solid anode. Examples of high capacity materials that can be included in the semi-solid anode 150, various formulations thereof and electrochemical cells formed therefrom, are described in the '606 application.

The semi-solid anode 150 and/or the semi-solid cathode 140 can also include a lithium metal, a lithium-containing material (e.g., LiFePO$_4$, Li(Mn$_{1/3}$, Ni$_{1/3}$Co$_{1/3}$)O$_2$ and LiMn$_2$O$_4$, and/or LiCoO$_2$), and/or a lithium metal equivalent (e.g., a lithium ion, which may or may not be intercalated and/or associated with an electrode material) in the semi-solid electrode composition. In some embodiments, the lithium metal can be included/introduced in the semi-solid anode 150 and/or the semi-solid cathode 140 during the mixing of the semi-solid electrode suspension. The lithium metal, lithium-containing material, and/or lithium metal equivalent can be present within the semi-solid anode and/or the semi-solid cathode in an amount that is sufficient to at least partially (or, in some embodiments, substantially fully) "pre-lithiate" the semi-solid anode and/or semi-solid cathode. For example, the lithium metal, lithium-containing material, and/or lithium metal equivalent can be included in the semi-solid anode 150 and/or semi-solid cathode 140 before the electrochemical cell 100 is assembled and formed. The lithium metal, lithium-containing material, and/or lithium metal equivalent can be configured to form an SEI layer on a surface of the active material included in the semi-solid electrode (e.g., the semi-solid anode 150) before an initial charging cycle of the electrochemical cell 100 (i.e., before electrochemical cell formation). Thus, little or no amount of lithium from the semi-solid cathode 140 is consumed in forming the SEI layer on the surface(s) of the semi-solid anode active material during the electrochemical cell 100 formation stage. Therefore, the possibility of loss in capacity of the semi-solid cathode 140 due to consumption of cathodic lithium ions in the anodic SEI layer formation is reduced or eliminated.

In some embodiments, the amount of lithium metal, lithium-containing material, and/or lithium metal equivalent may be sufficient to fully compensate for (i.e., prevent) the traditional lithium consumption that occurs in the formation of an SEI layer during initial cell cycling (e.g., lithium ions that are "robbed" from the cathode). In other embodiments, the amount of lithium metal, lithium-containing material, and/or lithium metal equivalent may exceed the amount required to fully compensate for the traditional SEI layer formation. In such embodiments, the excess lithium contained within the anode may help to offset capacity degradation due to side reactions occurring in the anode, and/or may constitute a "pre-charging" of the anode itself. The amount of pre-charging of the anode, by virtue of excess intercalated lithium (e.g., metallic Li or a compound or ion thereof), depends upon the amount of lithium metal, lithium-containing material, and/or lithium metal equivalent added. As a result, it is theoretically possible to achieve or exceed a "fully charged" anode state of the anode through pre-lithiation alone. As illustrated in Tables 1 through 6 (discussed below), the required amount of lithium (e.g., as provided in the form of lithium metal, lithium-containing material, and/or lithium metal equivalent) may be calculated by taking into account several factors. These factors may include, depending upon the embodiment, the capacity (e.g., charge capacity) of one or more active materials, the weight of one or more active materials, the percentage(s) of the capacity of one or more active materials that is irreversible, the weight and type of one or more additives, the irreversible capacity of the one or more additives, the capacity of lithium (e.g., lithium metal, lithium-containing material, and/or lithium metal equivalent), the overall capacity of the electrode, and the amount of additional (i.e., "buffer") capacity desired.

The amount of lithium metal included in the semi-solid anode 150 can depend on the active material included in the semi-solid anode 150. For example, in semi-solid anodes 150 that include graphite as the active material, the loss due to SEI layer formation is manifested essentially as an irreversible capacity loss during the first cycle (i.e., electrochemical cell formation) of the electrochemical cell 100. The added lithium metal can itself form an SEI contact with the electrolyte, which constitutes an additional irreversible loss. Therefore, the amount of lithium metal added to the semi-solid anode 150 can be directly related to the first cycle irreversible capacity loss of the electrochemical cell 100. Generally, in graphite anodes, the irreversible capacity loss can be about 5% to about 30% of the initial capacity of the anode. The amount of lithium metal that can be included in anodes that include graphite as the active material (e.g., graphite semi-solid anodes or any other anode that includes graphite) can be calculated as follows. Given that Faraday's constant is 96,500 C/mole, the formula weight of graphite is 12 grams per mole (i.e., a "6-C" ring has a molecular weight of ~72 g/mole), and its density is 2.2 grams per cm$^3$, the theoretical capacity of graphite is 372 mAh/g for pre-lithiation (for composition LiC$_6$), and the theoretical volumetric capacity is 818 mAh/cm$^3$. The calculation of the theoretical capacity of graphite (for LiC$_6$) is as follows:

Molecular weight of LiC$_6$: 79 g/gmole (Each Li takes one 6-C ring)

$$\frac{1 gmole\ Li^+\ released}{1 gmole\ LiC_6} \frac{1 gmole\ LiC_6}{72\ g\ C}$$

$$\frac{96500 coul}{1 gmole\ Li^+\ released} \frac{sec\ Amp}{1 coul.} \frac{1 hr}{3600 sec} \frac{1000\ mhr}{1 hr} = 372 \frac{mAhr}{g\ C}$$

Lithium metal has a formula weight of 6.94 grams per mole and a density of 0.5 grams per cm$^3$. The theoretical capacity of lithium metal is about 3,839 mAh/g, and its theoretical volumetric capacity is 1,915 grams per cm$^3$. Similar calculations can be performed for other commonly used active materials in anodes such as, for example, glassy carbon. In some embodiments, the amount of lithium metal included in the semi-solid anode 150 that includes graphite as an active material, can be in the range of about 1% to about 20% by volume. The lithium metal added to the semi-solid anode 150 and/or the semi-solid cathode 140 can also partially lithiate the semi-solid anode 150 and/or the semi-solid cathode. In such embodiments, during use of the electrochemical cell 100, the limiting concentrations of lithium in the charged and discharged state of the semi-solid anode 150 and/or the semi-solid cathode 140 can have a positive impact on the electrochemical cell voltage, capacity, life or other electronic properties.

In some embodiments in which the semi-solid anode 150 includes a high capacity material (e.g., silicon, tin or any other high capacity material described herein), the degree of lithiation should maintain the material in an operating range over which the least amount of volume change occurs. In the case of silicon, this would be somewhere in the range of 10%-80% lithiation. This can extend the life of the semi-solid anode 150 during charge/discharge cycling by limiting the expansion or contraction of the semi-solid anode 150. This is because the pre-lithiation of the semi-solid anode 150 allows the lithium to be intercalated into the high capacity material (e.g., silicon) before electrochemical cell formation. See "In situ Measurements of Stress Evolution in Silicon Thin Films During Electrochemical Lithiation and Delithiation," by V. Sethuraman, et al., Journal of Power Sources 195 (2010) 5062-5066, referenced above. The lithium in the pre-lithiated semi-solid anode 150 permanently shifts the lithium concentration range over which the anode is cycled, and increases the minimum lithium concentration in the semi-solid anode 150 at the end of the discharge (i.e., the semi-solid anode remains substantially lithiated throughout the charging and discharging of the cell before, during and after the electrochemical cell 100 formation). Therefore, in semi-solid anodes that include a high capacity material, the amount of lithium metal to be added for effective pre-lithiation can be determined by the optimum cycling range for the semi-solid anode 150 and can be calculated in a similar fashion as described herein with respect to graphite. For example, silicon has a formula weight of 29 grams per mole and density of 2.33 grams per cm$^3$ and can be pre-lithiated to a composition as high as $Li_{4.4}Si$. At this composition, the theoretical capacity of the pre-lithiated silicon is 4,212 mAh/g, and the corresponding theoretical volumetric capacity is 9,814 mAh-cm$^3$, which is based on the mass and volume of the starting silicon. Semi-solid anodes of the present disclosure that include high-capacity materials (e.g., silicon) may therefore be formulated to include sufficient lithium (i.e., at the "pre-lithiation stage") to minimize volume changes during cycling.

Since the lithium metal added to the semi-solid anode 150 that includes a high capacity material can be used to form the SEI layer as well as for partial lithiation of the anode, the amount of pre-lithiation can be determined based on the amount of active material present in the semi-solid anode 150. For example, in a semi-solid anode 150 that includes a high capacity material and inactive material but no active material, the amount of lithium added in the pre-lithiation will be used only to pre-lithiate the high capacity material (e.g., intercalate in the high capacity material). By contrast, in a semi-solid anode 150 that includes an active material, silicon as a high capacity material, and an inactive material, the amount of lithium added in the pre-lithiation will be utilized by the active material (e.g., in forming the SEI layer) as well as by the high capacity material (e.g., intercalation of the high capacity material). In addition, for a semi-solid anode that has large volume changes during cycling, additional loss of working lithium may be incurred during cycling as fracture of particles and/or aggregates of particles exposes new surface area to the electrolyte, and new SEI layer(s) can form on such surfaces.

Any suitable form of lithium metal can be included in the semi-solid anode 150 and/or the semi-solid cathode 140 for pre-lithiation. For example, the lithium metal can include lithium metal powder, lithium salt, and/or lithium foil. Furthermore, the lithium metal can have any shape or size such as, for example, powder, microparticles, nanoparticles, pieces, foil, etc. In some embodiments, lithium metal can be first deposited on a metal foil (e.g., a copper foil or an aluminum foil) or electrode. The semi-solid anode 150 and/or the semi-solid cathode 140 can be disposed on the metal foil or other electrode material and can be pre-lithiated from the metal foil or otherwise electrode by diffusion or electroplating before assembling the electrochemical cell 100.

The lithium metal used for pre-lithiation can be mixed in with the semi-solid anode 150 and/or semi-solid cathode 140 suspension during preparation of the suspensions. The lithium metal can have one or more coatings or treatments to protect it from the ambient environment such that the lithium metal does not react with ambient moisture during the mixing process. For example, the lithium metal can be treated with $CO_2$ or coated with Al—Li to protect the lithium metal from reacting with the environment. Once mixed, the electrolyte included in the semi-solid anode 150 and the semi-solid cathode 140 formulations can protect the lithium metal from reacting with the environment. In some embodiments, the coating on the lithium metal can be formulated to dissolve in the electrolyte such that lithium metal can interact with the components of the semi-solid anode 150 and/or the semi-solid cathode (e.g., form an SEI layer on the active material of the semi-solid anode 150).

In some embodiments, semi-solid anode 150 and semi-solid cathode 140 suspensions described herein can be mixed in a batch process, for example, with a batch mixer that can include, for example, a high shear mixture, a planetary mixture, a centrifugal planetary mixture, a sigma mixture, a CAM mixture, and/or a roller mixture, with a specific spatial and/or temporal ordering of component addition. In some embodiments, a semi-solid anode 150 and/or semi-solid cathode 140 suspension can be mixed in a continuous process (e.g. in an extruder), with a specific spatial and/or temporal ordering of component addition. Once the slurry components have been properly mixed, solid particles, for example, ion conductive polymers, can be further mixed with the semi-solid electrode slurry. In some embodiments, the slurry mixing can be performed at a low temperature, for example, lower than about 25 degrees Celsius (e.g., about 5 degrees Celsius). Once the semi-solid anode 150 and/or semi-solid cathode 140 suspensions have been cast into the semi-solid electrode, the temperature can be allowed to increase, for example, to greater than about 37 degrees Celsius. In some embodiments, mixing can be performed in a vacuum, in a moisture free environment, and/or in an inert gas atmosphere (e.g., under $N_2$ or Argon).

The mixing and forming of the components of the semi-solid cathode 140 and the semi-solid anode 150 suspensions generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments of that step. For example, each step in the process can be performed manually or by any of a variety of process equipment. Each step can also include one or more sub-processes and, optionally, an inspection step to monitor process quality.

In some embodiments, an anode according to the disclosure is mixed and dispensed via standard methods. A stabilized lithium metal powder is weighed such that the total mass of lithium (excluding inactive stabilizing coating) has the equivalent capacity to the target pre-lithiation capacity. The lithium powder is selected such that the average diameter of a particle is at least one order of magnitude smaller than the target height of the anode electrode. The powder is dispersed such that it uniformly covers the top of the anode electrode. Afterwards a separator is applied with a slight pressure to the top of the electrode, and a cathode electrode is placed on top of the separator to create a unit cell.

In some embodiments, the process conditions can be selected to produce a prepared semi-solid cathode 140 and/or semi-solid anode 150 suspensions having a mixing index of at least about 0.80, at least about 0.90, at least about 0.95, or at least about 0.975. In some embodiments, the process conditions can be selected to produce a semi-solid cathode 140 and/or semi-solid anode 150 suspension having an electronic conductivity of at least about $10^{-6}$ S/cm, at least about $10^{-5}$ S/cm, at least about $10^{-4}$ S/cm, at least about $10^{-3}$ S/cm, at least about $10^{-2}$ S/cm, at least about $10^{-1}$ S/cm, at least about 1 S/cm, or at least about 10 S/cm In some embodiments, the process conditions can be selected to produce a semi-solid cathode 150 and/or semi-solid anode 140 suspension having an apparent viscosity at room temperature of less than about 100,000 Pa-s, less than about 10,000 Pa-s, or less than about 1,000 Pa-s, all at an apparent shear rate of $1,000$ $s^{-1}$. In some embodiments, the process conditions can be selected to produce a semi-solid cathode 140 and/or semi-solid anode 150 suspension having two or more properties as described herein. Examples of systems and methods that can be used for preparing the semi-solid electrode compositions described herein are described in U.S. patent application Ser. No. 13/832,861 (also referred to as "the '861 application"), filed Mar. 15, 2013, entitled "Electrochemical Slurry Compositions and Methods for Preparing the Same," the entire disclosure of which is incorporated by reference herein.

Figure 2:
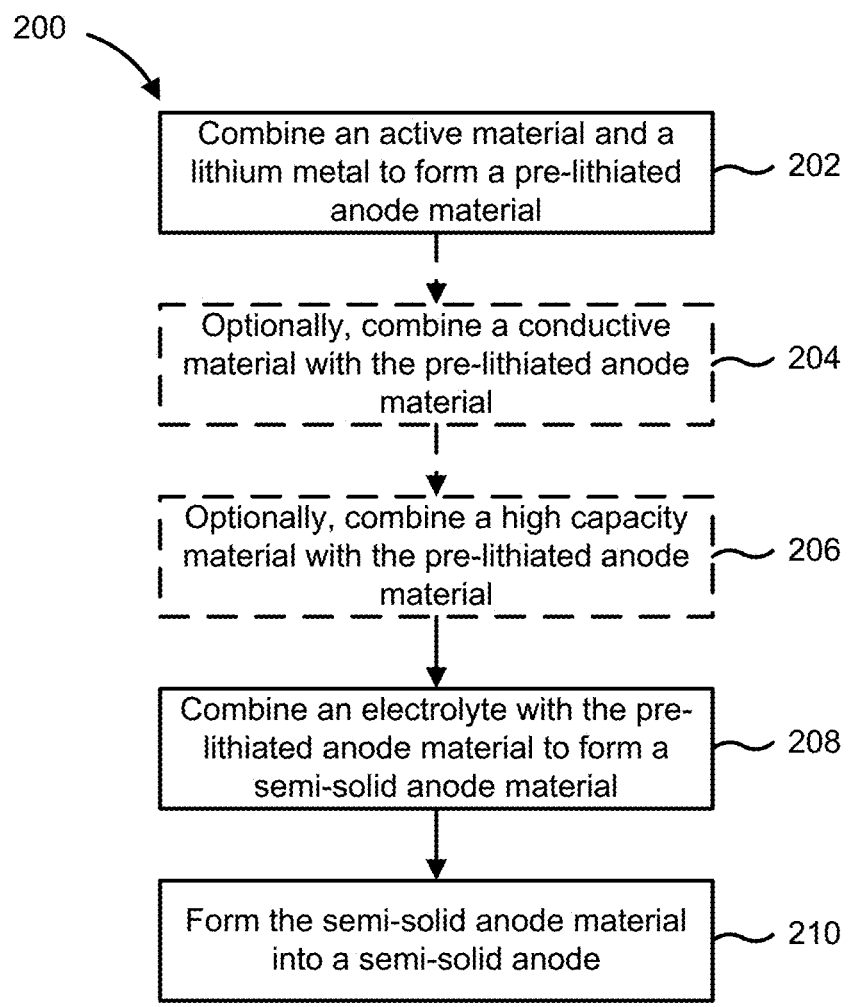
FIG. 2 is a schematic flow diagram of a method of preparing a pre-lithiated anode, according to an embodiment.

FIG. 2 is a schematic illustration of a method 200 for preparing a pre-lithiated semi-solid anode, for example, the semi-solid anode 150 or any other semi-solid anode described herein. The method 200 includes combining an active material and a lithium metal to form a pre-lithiated anode material, at 202. The active material can include any active material described with respect to the semi-solid anode 150, for example, graphite. The lithium metal can be in any form such as, for example, lithium metal powder, lithium salt, or lithium foil. Furthermore, the lithium metal can have any shape or size such as, for example, powder, microparticles, nanoparticles, pieces, foil, etc. In some embodiments, the lithium metal can be deposited on the surface of the active material. For example, microparticles or nanoparticles of the lithium metal can be deposited on the surface of the active material (e.g., graphite). In some embodiments, the lithium metal mixed with active material can be in liquid form. For example, the lithium metal can be in a molten state, or dissolved in an appropriate solvent to form a solution which can be mixed with the active material. In some embodiments, the lithium metal can have one or more coatings or treatments to protect it from the ambient environment such that the lithium metal does not react with ambient moisture during the mixing process. For example, the lithium metal can be treated with $CO_2$ or coated with Al—Li to protect the lithium metal from reacting with the environment. The thickness of the coating can be controlled to reduce reactivity of the lithium metal. Moreover, in some embodiments, the coating on the lithium metal can be formulated to dissolve in an electrolyte included in the semi-solid anode formulation, as described herein, such that lithium metal can interact with the components of the semi-solid anode, i.e., the active material. Combining the lithium metal with the active material can allow the lithium metal to form an SEI layer on a surface of the active material, as described herein.

In some embodiments, a conductive material can be combined with the pre-lithiated anode material, at 204. The conductive material can include carbon powder, CNTs or any other conductive material described with respect to the semi-solid anode 150.

In some embodiments, a high capacity material can also be combined with the pre-lithiated anode material, at 206. The high capacity material can include silicon, tin or any other high capacity material described with respect to the semi-solid anode 150. The lithium metal included in the pre-lithiated anode can also form an SEI layer on the high capacity material (e.g., silicon). Furthermore, the ions of the lithium metal can intercalate into the high capacity material, thereby urging the high capacity material to expand. In some embodiments, the lithium metal can be combined with a small portion of the total quantity of an active material and/or the high capacity material included in the semi-solid anode, and mixed such that a SEI layer forms over the portion of the active material and the high capacity material. Once the SEI layer is formed, the remaining active material and/or high capacity material can be combined with the pre-lithiated portion of the active material and/or the high capacity material.

An electrolyte is combined with the pre-lithiated anode material to form a semi-solid anode material, at 208. The electrolyte can include any suitable electrolyte, for example, any electrolyte described with respect to the semi-solid anode 150. The electrolyte can, for example, enable formation of the semi-solid anode suspension as well as short circuit the active material, conductive material, and/or high capacity material included in the semi-solid anode reducing tortuosity and impedance of the semi-solid anode. Furthermore, the electrolyte can dissolve any protective coating on the lithium metal and also facilitate the formation of the SEI layer by short circuiting the lithium metal with the active material and/or the high capacity material.

The semi-solid anode material is then formed into a semi-solid anode, at 210. For example, the semi-solid anode material can be casted, drop coated, or formed into the semi-solid anode using any suitable method described with respect to the semi-solid anode 150. The formed semi-solid anode can be paired with a cathode, for example, a semi-solid cathode (e.g., the semi-solid cathode 140) and included in an electrochemical cell, for example, the electrochemical cell 100. Since the pre-lithiated semi-solid anode formed using the method 200 already has the SEI layer formed over the active material, little or no amount of lithium is consumed from the cathode for forming the SEI layer during the electrochemical cell formation. Thus, the cathode can retain substantially all of its initial capacity (i.e., capacity before electrochemical cell formation) after the electrochemical cell formation process. Furthermore, if the pre-lithiated semi-solid anode formed using the method 200 includes a high capacity material, the lithium metal is already intercalated into the high capacity material such that the high capacity material, and thereby the pre-lithiated semi-solid anode, are pre-expanded. Thus, the pre-lithiated anode experiences only a negligible amount of expansion during the electrochemical cell formation process. This can substantially reduce any mechanical damage to the semi-solid anode due to the expansion, prevent reduction in voltage and/or capacity of the cell (e.g., cracking of the electrode and/or "capacity fade"), and enhance the performance and operational life of the pre-lithiated semi-solid anode and thereby, of the electrochemical cell.

The following examples show pre-lithiated anodes and electronic performance of pre-lithiated anodes prepared using the methods described herein. These examples are only for illustrative purposes and are not intended to limit the scope of the present disclosure.

Example 1: Pre-Lithiation of Semi-Solid Anode Using Lithium Coated Copper Foil

In this example, a semi-solid anode was pre-lithiated using a lithium coated copper foil. A semi-solid anode was prepared by mixing about 50%/o by volume of mesophase graphite powder (MGP-A from China Steel Chemical Corporation) as the active material, with about 2% by volume of carbon black (C45 obtained from Timcal) as the conductive material, and about 48% by volume of an electrolyte. The electrode included ethylene carbonate (EC) and gamma butyrolactone (GBL) in a 30:70 ratio, about 1.1 moles of $LiBF_4$, about 2% by weight of vinylene carbonate (VC), about 1.5% by weight of LiBOB, and about 0.5% by weight of tris (2-ethylhexyl) phosphate (TOP). The semi-solid anode components were mixed in a RESODYN® mixer for about 12 mins. The semi-solid anode was disposed on two sides of a lithium metal coated copper foil which also serves as the negative current collector. The semi-solid anode was paired with a semi-solid cathode. The semi-solid cathode included about 50% by volume of LFP as the active material, about 0.8% by volume of Ketjen black as the conductive material, and about 49.2% by volume of an electrolyte, which was same the electrolyte used to prepare the semi-solid anode suspension. The components of the semi-solid cathode were mixed in a speed mixer at about 1,250 rpm for about 90 seconds. The semi-solid cathode was disposed on one side of a current collector and paired with the semi-solid anode, with a spacer disposed therebetween to prepare a pre-lithiated electrochemical cell. Since the anode was disposed on both sides of the lithium coated copper foil, two cathodes were prepared and paired with the semi-solid anode disposed on each side of the lithium coated copper foil. The pre-lithiated electrochemical cell was disposed in a vacuum seal pouch and kept under dry conditions for 3 days to allow the lithium metal disposed on the lithium coated copper foil to pre-lithiate the anode.

Figure 3:
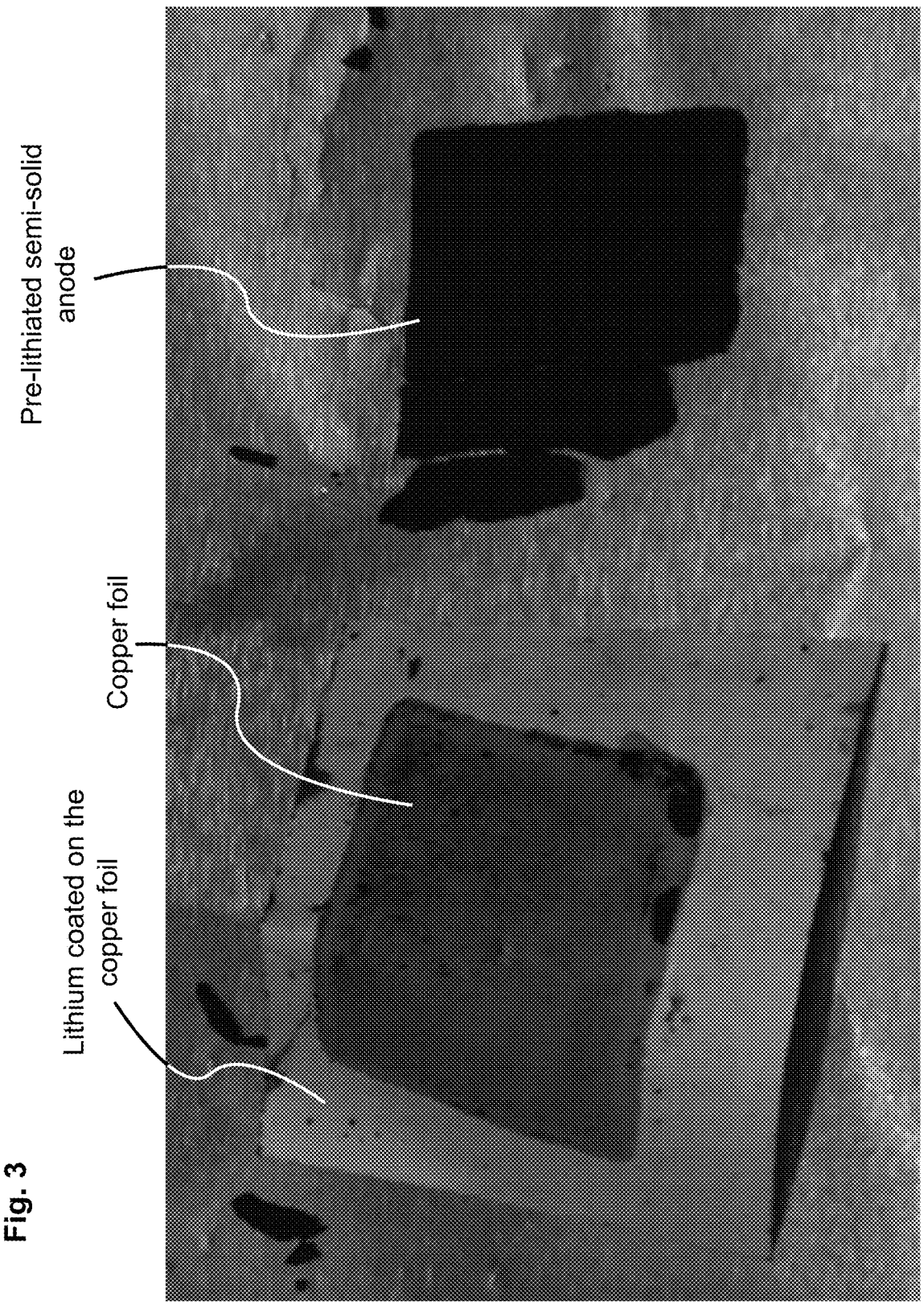
FIG. 3 shows an optical image of a copper foil coated with lithium used to pre-lithiate a semi-solid anode. The semi-solid anode is shown peeled off from the copper foil after pre-lithiation.

FIG. 3 shows a test semi-solid anode, prepared using the same process as the semi-solid anode described herein, peeled off from a lithium metal coated copper foil after three days of storage in a vacuum sealed pouch. The portion of the lithium metal coated copper foil on which the test semi-solid anode was disposed is devoid of any lithium after the anode is peeled off such that the underlying copper can be seen. This shows that the lithium metal disposed on the portion of the copper foil in contact with the test semi-solid anode diffused and/or reacted with the graphite included in the test semi-solid anode and possibly formed an SEI layer on the graphite thus, pre-lithiating the semi-solid anode.

A standard electrochemical cell was prepared in exactly the same manner as the pre-lithiated electrochemical cell except that the negative current collector included a bare copper foil not coated with the lithium metal. Thus, the semi-solid anode of the standard electrochemical cell was not pre-lithiated.

The pre-lithiated electrochemical cell which included the pre-lithiated semi-solid anode was subjected to electrochemical tests to determine the electronic performance of the electrochemical cell. The electrochemical was subjected to 2 cycles at a C-Rate of C/10 and 10 cycles at a C-rate of C/4. All testing was performed using a MACCOR® battery tester.

Figure 4A:
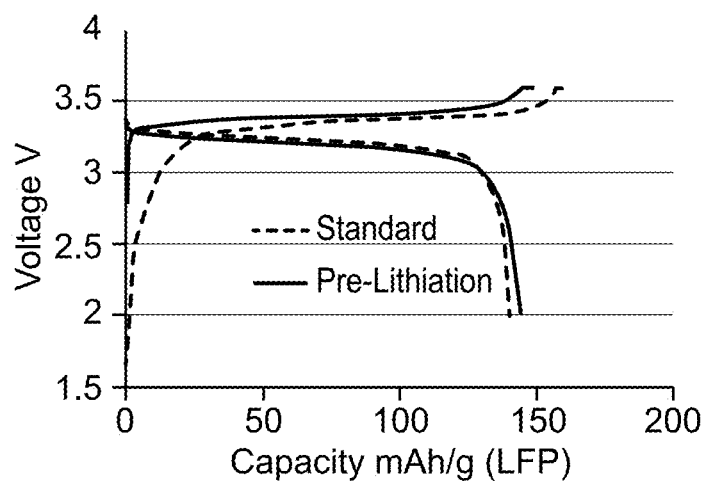
FIG. 4A is a voltage vs capacity profile of a standard electrochemical cell that includes a standard semi-solid anode, and a pre-lithiated electrochemical cell that includes a pre-lithiated semi-solid anode.
Figure 4B:
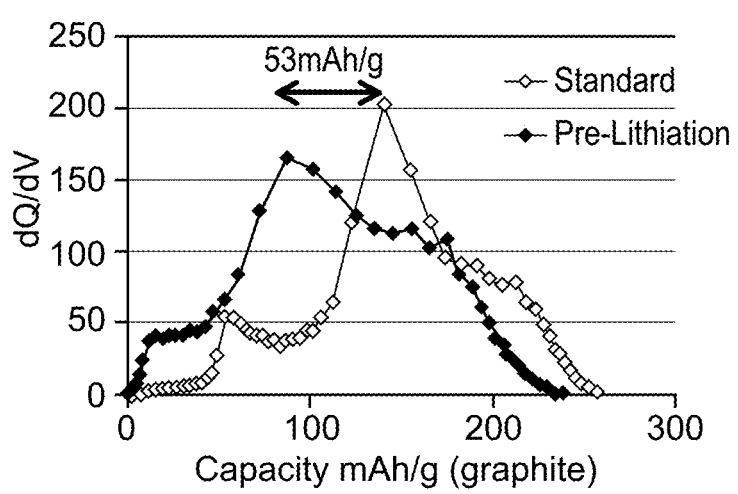
FIG. 4B is a differential capacitance (dQ/dV) versus charge capacity plot of the standard electrochemical cell and the pre-lithiated electrochemical cell.

FIG. 4A shows a plot of voltage vs capacity of the pre-lithiated electrochemical cell and the standard electrochemical cell after one charge/discharge cycle, and FIG. 4B shows a plot of differential capacity (dQ/dV) vs capacity of the pre-lithiated and standard electrochemical cells, derived from FIG. 4A. The Coulomb efficiency of the pre-lithiated electrochemical cell was about 96.6%, and the Coulomb efficiency of the standard electrochemical cell was about 88.2%. As can be seen in FIGS. 4A and 4B, the pre-lithiated electrochemical cell charges substantially faster compared to the standard electrochemical cell. While the final capacity retained by the pre-lithiated electrochemical cell is slightly lower than the standard electrochemical cell, this is attributed to lower cell quality and data variation. One explanation can be that since the semi-solid anode is disposed on the lithium coated copper current collector and a portion of the lithium in contact with the semi-solid anode intercalates with the semi-solid anode material to pre-lithiate the semi-solid anode, the copper foil disposed below the lithium metal contacts the pre-lithiated semi-solid anode. This contact can however, be of poor quality which can increase impedance and reduce overall charge capacity of the pre-lithiated electrochemical cell prepared using the lithium coated copper foil method.

Figure 5A:
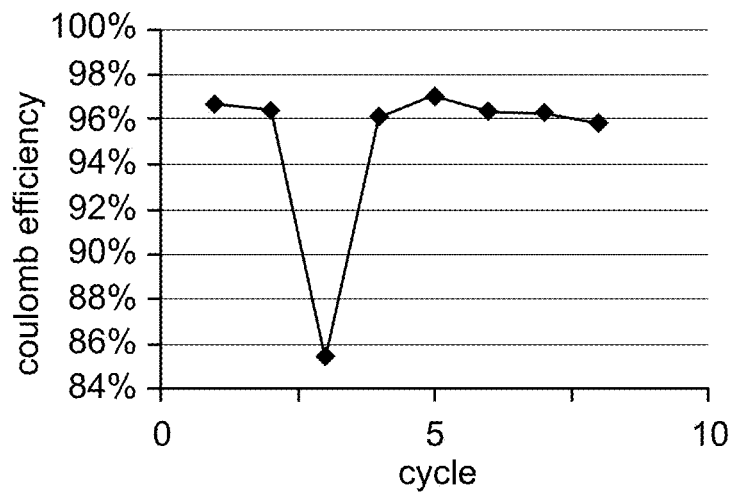
FIG. 5A is plot of Coulomb efficiency and FIG. 5B is a plot of capacity retained by the second electrochemical cell that includes the pre-lithiated semi-solid anode shown in FIG. 3, after 8 charge and discharge cycles.
Figure 5B:
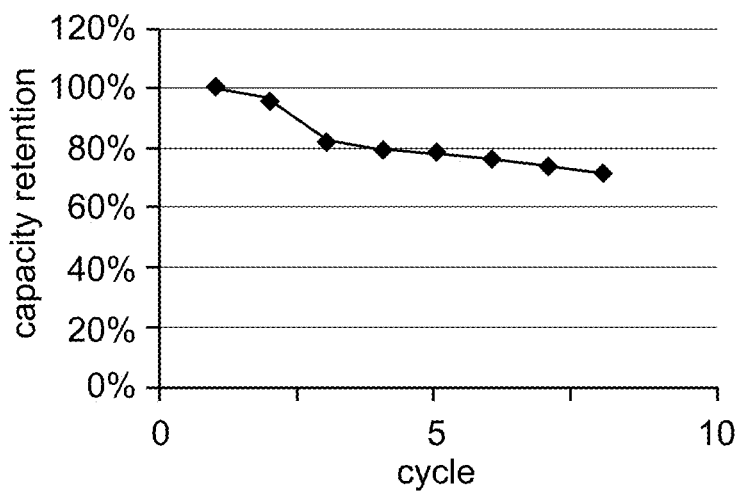

FIG. 5A shows a plot of Coulomb efficiency of the pre-lithiated electrochemical cell after 8 cycles, while FIG. 5B shows a plot of capacity retained by the pre-lithiated electrochemical cell after 8 cycles. The pre-lithiated electrochemical cell retained about 96% of its initial Coulomb efficiency, and retains about 72% of its initial capacity after 8 cycles. This again is attributed to the low quality of the pre-lithiated electrochemical cell because of the low quality of the electronic contact between the pre-lithiated semi-solid anode with the copper foil negative current collector after the lithium metal coating reacts with the semi-solid anode active material and is incorporated into the semi-solid anode.

Figure 6B:
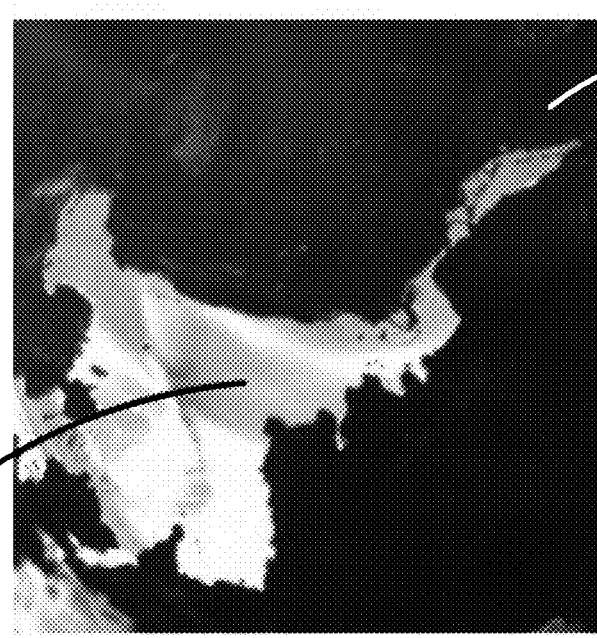
FIG. 6B shows the semi-solid anode suspension after mixing and storing for 1 day.
Figure 6A:
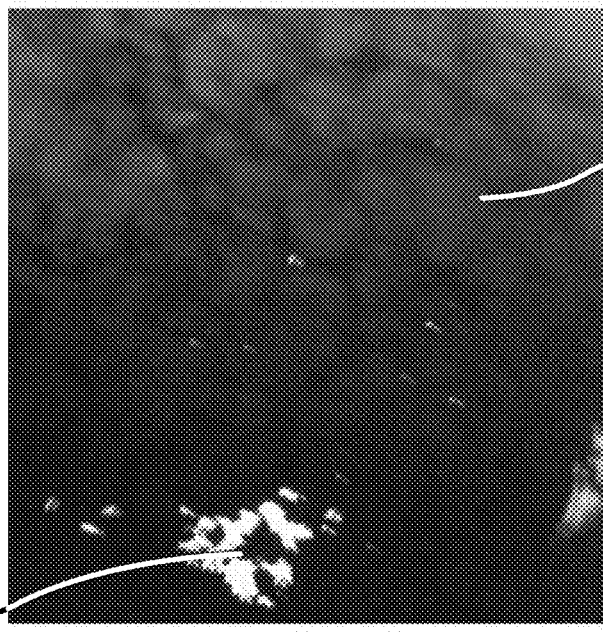
FIG. 6A shows an optical image of a semi-solid anode suspension on which lithium metal powder is disposed before mixing.

Example 2: Pre-Lithiation by Mixing Lithium Powder in Semi-Solid Anode Suspension In this example, a lithium powder was incorporated into a semi-solid anode during the preparation of the semi-solid anode suspension to pre-lithiate the anode. A semi-solid anode suspension was prepared similar to the semi-solid anode described in Example 1. The semi-solid anode was mixed with lithium powder and stored for 1 day. The quantity of the lithium powder mixed with the semi-solid anode suspension was such that the capacity of the lithium powder was about 15% of the total charge capacity (including that of the graphite) included in the semi-solid anode. FIG. 6A shows an optical image of the semi-solid anode with the lithium powder added but not mixed into the semi-solid anode suspension. The semi-solid anode suspension appeared wet showing that lithium metal has not reacted with the semi-solid anode active material, i.e., graphite. FIG. 6B shows the semi-solid anode suspension after mixing and storing for 1 day. The semi-solid anode suspension appeared dry after 1 day which indicated that the lithium had reacted with the graphite, possibly forming an SEI layer on the graphite.

Tables 1-6 below contain exemplary electrode component parameters according to some embodiments of the disclosure, as well as calculations of the theoretical percentage of lithium present in a prelithiated semi-solid anode prior to the application of current under various scenarios. Table 1 shows exemplary parameters and calculations for an anode formulation in which a single active material (mesophase graphite powder (MGP-A)) is used, and in which the lithium content is sufficient for fully "pre-lithiating" (i.e., compensating for the traditional SEI formation) without any additional "buffer" or extra capacity by way of excess intercalated lithium. Table 2 shows exemplary parameters and calculations for an anode formulation in which a single active material (MGP-A) is used, and in which the lithium percentage is calculated to include a 5% buffer (i.e., the graphite is ~5% charged prior to cell assembly and/or cycling). Tables 3 and 4 include parameters and calculations similar to those in Table 2, but are directed to buffer percentages of 50% and 100%, respectively. Table 5 shows exemplary parameters and calculations for an anode formulation in which two active materials (MGP-A and soft carbon) are used, and in which the lithium percentage is calculated to include a 5% buffer. Table 6 shows exemplary parameters and calculations for an anode formulation in which two active materials (MGP-A and silicon, a high-capacity material) are used, and in which the lithium percentage is calculated to include a 5% buffer.

TABLE 1

| One Active Material, Na Buffer | |
|---|---|
| Total electrode weight | 1 g |
| Active Material 1 = mesophase graphite powder (MGP-A) | 50% by volume |
| Carbon additive = carbon black | 2% by volume |
| Electrolyte | 48% by volume |
| Electrolyte composition | |
| ethylene carbonate (EC) | 30:00:00 ratio |
| gamma butyrolactone (GBL) | 70:00:00 |
| LiBF4 | 1.1 moles |
| vinylene carbonate (VC) | 2% by weight |
| LiBOB | 1.5% by weight |
| Tris (2-ethylhexyl) phosphate (TOP) | 0.5% by weight |
| Density | |
| Active Material 1 = mesophase graphite powder (MGP-A) | 2.27 g/cc |
| Carbon additive = carbon black | 1.9 g/cc |
| Electrolyte | 1.26 g/cc |
| Active Material 1 = mesophase graphite powder (MGP-A) | 63.84% by weight |
| Carbon additive = carbon black | 2.14% by weight |
| Electrolyte | 34.02% by weight |
| Weight | |
| g1: Active Material 1 = mesophase graphite powder (MGP-A) | 0.639 g |
| c: Carbon additive = carbon black | 0.021 g |
| e: Electrolyte | 0.340 g |
| a1: Capacity of Active Material 1 (mesophase graphite): | 360 mAh/g (<-- @0.1 C) |
| x1: Estimated % of a1 that is irreversible: | 10% |
| y: Irreversible capacity of carbon additive | 200 mAh/g |
| b: Capacity of lithium metal | 3860 mAh/g |
| d: (a1 * g1 * x1 + a2 * g2 * x2 + . . . an * gn * xn)/b | |
| d = | 0.00595 g |
| % w = d/(g + d + c + e) = % lithium present in the perlithiated semi-solid anode prior to the application of current | |
| % w = | 0.592% |

TABLE 2

| One Active Material, 5% Buffer | |
|---|---|
| Total electrode weight | 1 g |
| Active Material 1 = mesophase graphite powder (MGP-A) | 50% by volume |
| Carbon additive = carbon black | 2% by volume |
| Electrolyte | 48% by volume |
| Electrolyte composition | |
| ethylene carbonate (EC) | 30:00:00 ratio |
| gamma butyrolactone (GBL) | 70:00:00 |

TABLE 2-continued

| One Active Material, 5% Buffer | |
|---|---|
| LiBF4 | 1.1 moles |
| vinylene carbonate (VC) | 2% by weight |
| LiBOB | 1.5% by weight |
| Tris (2-ethylhexyl) phosphate (TOP) | 0.5% by weight |
| Density | |
| Active Material 1 = mesophase graphite powder (MGP-A) | 2.27 g/cc |
| Carbon additive = carbon black | 1.9 g/cc |
| Electrolyte | 1.26 g/cc |
| Active Material 1 = mesophase graphite powder (MGP-A) | 63.84% by weight |
| Carbon additive = carbon black | 2.14% by weight |
| Electrolyte | 34.02% by weight |
| Weight | |
| $g_1$: Active Material 1 = mesophase graphite powder (MGP-A) | 0.638 g |
| c: Carbon additive = carbon black | 0.021 g |
| e: Electrolyte | 0.340 g |
| $a_1$: Capacity of Active Material 1 (mesophase graphite): | 360 mAh/g (<-- @0.1 C) |
| $x_1$: Estimated % of $a_1$ that is irreversible: | 10% |
| b: Capacity of lithium metal | 3860 mAh/g |
| z: Extra (for improving cycle life) | 5% <-- buffer |
| y: Irreversible capacity of carbon additive | 200 mAh/g |
| h: Capacity of electrode | 206.85116 mAh |
| d: $(a_1 * g_1 * x_1 + a_2 * g_2 * x_2 + \ldots a_n * g_n * x_n + c * y + h * z)/b$ | |
| d = | 0.00974 g |
| % w = d/(g + d + c + e) = % lithium present in the prelithiated semi-solid anode prior to the application of current | |
| % w = | 0.965% |

TABLE 3

| One Active Material, 50% Buffer | |
|---|---|
| Total electrode weight | 1 g |
| Active Material 1 = mesophase graphite powder (MGP-A) | 50% by volume |
| Carbon additive = carbon black | 2% by volume |
| Electrolyte | 48% by volume |
| Electrolyte composition | |
| ethylene carbonate (EC) | 30:00:00 ratio |
| gamma butyrolactone (GBL) | 70:00:00 |
| LiBF4 | 1.1 moles |
| vinylene carbonate (VC) | 2% by weight |
| LiBOB | 1.5% by weight |
| Tris (2-ethylhexyl) phosphate (TOP) | 0.5% by weight |
| Density | |
| Active Material 1 = mesophase graphite powder (MGP-A) | 2.27 g/cc |
| Carbon additive = carbon black | 1.9 g/cc |
| Electrolyte | 1.26 g/cc |
| Active Material 1 = mesophase graphite powder (MGP-A) | 63.84% by weight |
| Carbon additive = carbon black | 2.14% by weight |
| Electrolyte | 34.02% by weight |
| Weight | |
| $g_1$: Active Material 1 = mesophase graphite powder (MGP-A) | 0.638 g |
| c: Carbon additive = carbon black | 0.021 g |
| e: Electrolyte | 0.340 g |
| $a_1$: Capacity of Active Material 1 (mesophase graphite): | 360 mAh/g (<-- @0.1 C) |
| $x_1$: Estimated % of $a_1$ that is irreversible: | 10% |
| b: Capacity of lithium metal | 3860 mAh/g |

TABLE 3-continued

One Active Material, 50% Buffer

| | |
|---|---|
| z: Extra (for improving cycle life) | 50% <-- buffer |
| y: Irreversible capacity of carbon additive | 200 mAh/g |
| h: Capacity of electrode | 206.8512 mAh |
| d: (a1 * g1 * x1 + a2 * g2 * x2 + . . . an * gn * xn + c * y + h * z)/b | |
| d = | 0.03386 g |
| % w = d/(g + d + c + e) = % lithium present in the prelithiated semi-solid anode prior to the application of current | |
| % w = | 3.275% |

TABLE 4

One Active Material, 100% Buffer

| | |
|---|---|
| Total electrode weight | 1 g |
| Active Material 1 = mesophase graphite powder (MGP-A) | 50% by volume |
| Carbon additive = carbon black | 2% by volume |
| Electrolyte | 48% by volume |
| Electrolyte composition | |
| ethylene carbonate (EC) | 30:00:00 ratio |
| gamma butyrolactone (GBL) | 70:00:00 |
| LiBF4 | 1.1 moles |
| vinylene carbonate (VC) | 2% by weight |
| LiBOB | 1.5% by weight |
| Tris (2-ethylhexyl) phosphate (TOP) | 0.5% by weight |
| Density | |
| Active Material 1 = mesophase graphite powder (MGP-A) | 2.27 g/cc |
| Carbon additive = carbon black | 1.26 g/cc |
| Electrolyte | 1.26 g/cc |
| Active Material 1 = mesophase graphite powder (MGP-A) | 63.84% by weight |
| Carbon additive = carbon black | 2.14% by weight |
| Electrolyte | 34.02% by weight |
| Weight | |
| g1: Active Material 1 = mesophase graphite powder (MGP-A) | 0.638 g |
| c: Carbon additive = carbon black | 0.021 g |
| e: Electrolyte | 0.340 g |
| a1: Capacity of Active Material 1 (mesophase graphite): | 360 mAh/g (<-- @0.1 C) |
| x1: Estimated % of a1 that is irreversible: | 10% |
| b: Capacity of lithium metal | 3860 mAh/g |
| z: Extra (for improving cycle life) | 100% <-- buffer |
| y: Irreversible capacity of carbon additive | 200 mAh/g |
| h: Capacity of electrode | 206.8512 mAh |
| d: (a1 * g1 * x1 + a2 * g2 * x2 + . . . an * gn * xn + c * y + h * z)/b | |
| d = | 0.06065 g |
| % w = d/(g + d + c + e) = % lithium present in the prelithiated semi-solid anode prior to the appl'n of current | |
| % w = | 5.718% |

TABLE 5

Two Active Material (MGP-A and soft Carbon), 5% Buffer

| | |
|---|---|
| Total electrode weight | 1 g |
| Active Material 1 = mesophase graphite powder (MGP-A) | 25% by volume |
| Active Material 2 = soft carbon | 25% by volume |
| Carbon additive = carbon black | 2% by volume |
| Electrolyte | 48% by volume |
| Electrolyte composition | |
| ethylene carbonate (EC) | 30:00:00 ratio |
| gamma butyrolactone (GBL) | 70:00:00 |

TABLE 5-continued

Two Active Material (MGP-A and soft Carbon), 5% Buffer

| | |
|---|---|
| LiBF4 | 1.1 moles |
| vinylene carbonate (VC) | 2% by weight |
| LiBOB | 1.5% by weight |
| Tris (2-ethylhexyl) phosphate (TOP) | 0.5% by weight |
| Density | |
| Active Material 1 = mesophase graphite powder (MGP-A) | 2.27 g/cc |
| Active Material 2 = soft carbon | 2 g/cc |
| Carbon additive = carbon black | 1.9 g/cc |
| Electrolyte | 1.26 g/cc |
| Active Material 1 = mesophase graphite powder (MGP-A) | 33.18% by weight |
| Active Material 2 = soft carbon | 29.23% by weight |
| Carbon additive = carbon black | 2.22% by weight |
| Electrolyte | 35.36% by weight |
| Weight | |
| g1: Active Material 1 = mesophase graphite powder (MGP-A) | 0.319 g |
| g2: Active Material 2 = soft carbon | 0.150 g |
| c: Carbon additive = carbon black | 0.022 g |
| e: Electrolyte | 0.354 g |
| a1: Capacity of Active Material 1 (mesophase graphite): | 360 mAh/g (<-- @0.1 C) |
| a2: Capacity of Active Material 2 (soft carbon): | 391 mAh/g (<-- @0.1 C) |
| x1: Estimated % of a1 that is irreversible: | 10% |
| x2: Estimated % of a2 that is irreversible: | 10% |
| b: Capacity of lithium metal | 3860 mAh/g |
| z: Extra (for improving cycle life) | 5% <-- buffer |
| y: Irreversible capacity of carbon additive | 200 mAh/g |
| h: Capacity of electrode | 156.1 mAh |
| d: (a1 * g1 * x1 + a2 * g2 * x2 + . . . an * gn * xn + c * y + h * z)/b | |
| d = | 0.00767 g |
| % w = d/(g + d + c + e) = % lithium present in the prelithiated semi-solid anode prior to the application of current | |
| % w = | 1.091% |

TABLE 6

Two Active Material (MGP-A and and Silicon), 5% Buffer

| | |
|---|---|
| Total electrode weight | 1 g |
| Active Material 1 = mesophase graphite powder (MGP-A) | 25% by volume |
| Active Material 2 = silicon | 25% by volume |
| Carbon additive = carbon black | 2% by volume |
| Electrolyte | 48% by volume |
| Electrolyte composition | |
| ethylene carbonate (EC) | 30:00:00 ratio |
| gamma butyrolactone (GBL) | 70:00:00 |
| LiBF4 | 1.1 moles |
| vinylene carbonate (VC) | 2% by weight |
| LiBOB | 1.5% by weight |
| Tris (2-ethylhexyl) phosphate (TOP) | 0.5% by weight |
| Density | |
| Active Material 1 = mesophase graphite powder (MGP-A) | 2.27 g/cc |
| Active Material 2 = silicon | 2.33 g/cc |
| Carbon additive = carbon black | 1.9 g/cc |
| Electrolyte | 1.26 g/cc |
| Active Material 1 = mesophase graphite powder (MGP-A) | 31.65% by weight |
| Active Material 2 = silicon | 32.49% by weight |
| Carbon additive = carbon black | 2.12% by weight |
| Electrolyte | 33.73% by weight |
| Weight | |
| g1: Active Material 1 = mesophase graphite powder (MGP-A) | 0.317 g |
| g2: Active Material 2 = silicon | 0.325 g |
| c: Carbon additive = carbon black | 0.021 g |

TABLE 6-continued

Two Active Material (MGP-A and and Silicon), 5% Buffer

| | |
|---|---|
| e: Electrolyte | 0.337 g |
| a1: Capacity of Active Material 1 (mesophase graphite): | 360 mAh/g (<-- @0.1 C) |
| a2: Capacity of Active Material 2 (silicon): | 4200 mAh/g (<-- @0.1 C) |
| x1: Estimated % of a1 that is irreversible: | 10% |
| x2: Estimated % of a2 that is irreversible: | 33% |
| b: Capacity of lithium metal | 3860 mAh/g |
| z: Extra (for improving cycle life) | 5% <-- buffer |
| y: Irreversible capacity of carbon additive | 200 mAh/g |
| h: Capacity of electrode | 1016.86 mAh |
| d: (a1 * g1 * x1 + a2 * g2 * x2 + . . . an * gn * xn + c * y + h * z)/b | |
| d = | 0.13389 g |
| % w = d/(g + d + c + e) = % lithium present in the prelithiated semi-solid anode prior to the application of current | |
| % w = | 16.550% |

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of preparing a pre-lithiated semi-solid anode, comprising:
mixing an active material, a lithium metal or lithium-containing material, and an electrolyte to form a pre-lithiated semi-solid anode material such that a solid-electrolyte interface (SEI) layer at least partially forms during the mixing, the lithium metal or lithium-containing material having a solid phase, the lithium metal or lithium-containing material in an amount sufficient to provide a buffer for active lithium ions during cycling; and
forming the pre-lithiated semi-solid anode material into a pre-lithiated semi-solid anode.

2. The method of claim 1, further comprising:
combining a conductive material with the pre-lithiated anode material.

3. The method of claim 1, further comprising:
combining a high capacity material with the pre-lithiated anode material.

4. A method of manufacturing an anode, the method comprising:
mixing an active material, a conductive material, an electrolyte, and a lithium metal and/or lithium-containing material to form an anode mixture such that a solid-electrolyte interface (SEI) layer at least partially forms during the mixing, the lithium metal and/or lithium-containing material having a solid phase, the lithium metal and/or lithium-containing material in an amount sufficient to provide a buffer for active lithium ions during cycling; and
storing the anode mixture in a dry environment for a duration sufficient to substantially pre-lithiate the anode mixture prior to its incorporation into an electrochemical cell.

5. The method of claim 4, wherein the storage duration is sufficient to form the SEI layer on substantially all of the surface area of the active material.

6. The method of claim 4, wherein the active material constitutes between 20% and 90% of the anode mixture.

7. The method of claim 4, wherein the liquid electrolyte constitutes between 10% and 70% of the anode mixture.

8. The method of claim 4, wherein the anode mixture further comprises a high capacity material.

9. A method of manufacturing an electrochemical cell, the method comprising:
assembling a cell stack, the assembling including:
mixing an anode mixture comprising an active material, a conductive material, an electrolyte, and a lithium-bearing material having a solid phase, such that a solid-electrolyte interface (SEI) layer at least partially forms during the mixing, the lithium bearing material in an amount sufficient to provide a buffer for active lithium ions during cycling;
placing a separator membrane atop the anode mixture; and
placing a cathode atop the separator membrane; and
storing the cell stack in a dry environment for a duration sufficient to substantially pre-lithiate the anode mixture prior to cycling.

10. The method of claim 9, wherein the storage duration is sufficient to form the SEI layer on substantially all of the surface area of the active material.

11. The method of claim 9, wherein the active material constitutes between 20% and 90% of the anode mixture.

12. The method of claim 9, wherein the anode mixture further comprises a high capacity material.

13. The method of claim 9, the assembling further including:
preparing a cathode mixture comprising:
a further active material;
a further conductive material;
a further electrolyte; and
lithium in an amount sufficient to increase the stability of the cathode, and forming the cathode from the cathode mixture.

* * * * *